United States Patent
Schulze-Wartenhorst

(10) Patent No.: US 6,866,003 B2
(45) Date of Patent: Mar. 15, 2005

(54) MILKING DEVICE AND METHOD

(75) Inventor: Bernhard Schulze-Wartenhorst, Warendorf (DE)

(73) Assignee: WestfaliaSurge GmbH, Oelde (DE)

( * ) Notice: Subject to any disclaimer, the term of this patent is extended or adjusted under 35 U.S.C. 154(b) by 0 days.

(21) Appl. No.: 10/759,016

(22) Filed: Jan. 20, 2004

(65) Prior Publication Data

US 2004/0244700 A1 Dec. 9, 2004

(30) Foreign Application Priority Data

Jul. 20, 2001 (DE) .......................................... 101 35 447

(51) Int. Cl.$^7$ ................................................ A01J 5/04
(52) U.S. Cl. ................................ 119/14.47; 119/14.18; 119/14.44
(58) Field of Search .......................... 119/14.47, 14.03, 119/14.08, 14.18, 14.38, 14.44, 14.48, 14.5, 14.51

(56) References Cited

U.S. PATENT DOCUMENTS

| | | |
|---|---|---|
| 3,629,005 A | 12/1971 | Belden |
| 3,688,783 A | 9/1972 | Owens |
| 5,809,932 A * | 9/1998 | van den Berg .......... 119/14.47 |

FOREIGN PATENT DOCUMENTS

| | | |
|---|---|---|
| DE | 198 02 887 A1 | 7/1999 |
| GB | 1035004 | 7/1966 |
| WO | WO 01/32004 A1 | 5/2001 |

* cited by examiner

Primary Examiner—Yvonne R. Abbott
(74) Attorney, Agent, or Firm—Lawrence E. Laubscher, Sr.

(57) ABSTRACT

This invention relates to a method and device for checking the teat rubber of a teat cup. The object of this invention is providing a simple and reliable method for checking the teat rubber and a device suitable for implementing the method. In this respect, this invention suggests that the behavior of the teat rubber is acquired with a pressure difference profile acting between the pulse cavity and the pressure cavity and this currently determined behavior is compared with a reference behavior. The device according to the invention comprises a device for the direct checking of the teat rubber behavior.

21 Claims, 2 Drawing Sheets

MILKING DEVICE AND METHOD

CROSS REFERENCE TO RELATED APPLICATIONS

BACKGROUND OF THE INVENTION

1. Field of the Invention

The present invention relates to a milking device with at least one teat cup, which comprises an internal cavity for accommodating the teat of the animal to be milked through an opening of the teat cup as well as a pulse cavity separated from the internal cavity by a teat rubber, the said pulse cavity being able to be connected to a negative pressure source.

2. Brief Description of the Related Art

During the milking of animals, teat cups are normally used, which comprise an internal cavity for the accommodation of the teat of the animal to be milked, which is surrounded at its circumference by a teat rubber. A membrane, which is formed from an elastic material, is designated as the teat rubber. It is not essential that this is rubber. The teat rubber separates the internal cavity from a pulse cavity which is surrounded at its circumference by a teat cup housing. The pulse cavity regularly communicates through tubes with a source of negative pressure. During milking a negative pressure is first produced in the pulse cavity in the so-called suction phase, the negative pressure then being reduced in the so-called relief phase. In this relief phase the teat rubber, which is pulled outwards radially in the suction phase, collapses. A pulse cycle consists of a suction and a relief phase. The milked milk is drawn off via a milk line communicating with the internal cavity. A negative pressure is regularly produced in the internal cavity below the teat through this milk line, said negative pressure sucking the milk from the teat cup.

The pressure profile and the absolute pressure during the pulse cycle in the pulse cavity are controlled. Normally in this respect, each milking device, which comprises a number of teat cups equal to the number of teats on the animal to be milked, comprises a pulsator. The delivery of milk when milking an animal is stimulated with the set pressure difference profile, i.e. the pressure difference between the internal cavity and the pulse cavity and the temporal sequence of this pressure difference. First, in a so-called set-up phase, a specific movement of the teat rubber can then be imposed, which increases the readiness of the animal to deliver milk. Thereafter, the setting of a temporarily changing, cyclically recurring pressure profile occurs for drawing off the milk. The setting occurs in each case with regard to the desired movement of the teat rubber. In the relief phase this presses in particular circumferentially against the teat, whereas the teat is stretched in the circumferential direction during the suction phase.

With increasing automation and the more intensive employment of external workers and during milking, in particular of cows using automatic milking methods without human supervision, the requirement for automatic control of the most important functions of the milking system increases. These important functions also include the pressure conditions in the teat cup, in particular the radial pressure from the teat rubber acting on the teat.

In the attempts to define a possible automatic control of the most important functions it is initially obvious that the control signals in the pulsator should be monitored to enable conclusions to be drawn about the pressure relationships in the teat cup. However, this type of control only reproduces the electrical control signals, but not the actual pressure conditions in the teat cup. Pressure sensors built into the teat cup also only allow information to be obtained indirectly about the movement of the teat rubber, which can lead to erroneous assessments of the actual movement of the teat rubber. In particular, ageing processes on the teat rubber can lead to the pressure set-point values, once they are set as correct, no longer being obtained. This type of behavior cannot however be found, or only inadequately found, based on the measured pressure values in the individual pressure cavities. Also there is the problem of impairment or damage to the sensitive pressure sensors under the harsh conditions in practice.

From DE-A-198 02 887 a measurement device is known, which can be introduced through the opening into the internal cavity of a teat cup. This measurement device comprises a "measuring teat" which replicates the geometry of the teat and which has on its circumferential surface film circuit boards applied to the "measuring teat" on a basic body for the spatial resolution of a pressure signal. These are covered with a layer of foamed material and coated with a protective layer. The known measurement device is relatively complicated in construction and must be used at regular intervals for checking the milking device. These time intervals must be defined and monitored by trained operating personnel.

BRIEF SUMMARY OF THE INVENTION

The object of this invention is to provide a device and method for checking the behavior of the teat rubber with improved reliability.

With this invention, for the solution of the above problem a cleaning and/or disinfecting device with at least one mandrel is suggested, which mandrel comprises at least one outlet for fluid, in particular for a cleaning and/or disinfecting solution, whereby such outlet for fluid can be connected through the opening to the internal cavity, as well as with a device assigned to the mandrel, for checking the teat rubber behavior.

With the device according to the invention the device for checking the teat rubber behavior forms a constituent part of the cleaning or disinfecting device. Accordingly, cleaning the internal cavity also leads as a matter of course to the checking of the teat rubber behavior. In other words, with each cleaning of the teat cup, the quality of the teat rubber is also monitored. The device according to the invention is preferably assigned stationary to a milking station in the milking parlor. Here, the animals of the herd to be milked are brought past and milked consecutively. After each milking each teat cup is both cleaned as well as checked for the quality of the teat rubber.

Consequently with automatic milking, in which normally a cow steps over a milking device, which is then placed on the udder, the milking device can be cleaned after each single milking process on a single cow and the quality of the teat rubber checked on each individual cup. With other types of milking system the teat rubber behavior can be checked after milking the complete herd. These types of milking system normally include semi-automatic or purely manually operated milking systems, in which the milking device is at least manually applied. Once a cow has been milked, the internal cavity is flushed at least with water. However, with both types of system it is not necessary to define and monitor specific checking and service intervals. Also a separate device which is used for checking the teat rubber behavior can be omitted. The device according to the invention is therefore simpler in construction and, due to the routine checking of the teat rubber after each milking of an animal, it leads to reliable detection of faults. A faulty teat cup or a malfunction of a pulsator is detected when changing the teat cup from one animal to the next one, so that the animals of the herd to be milked are milked in a more careful manner.

Preferably the mandrel comprises a pressure measurement probe, which measures the absolute pressure present in the internal cavity. In combination with a preferred development of this type, the mandrel preferably comprises a sealing surface which contacts the teat rubber for sealing. With a development of this type, the mandrel only needs to be formed such that it seals the teat rubber circumferentially in the opening region of the teat cup and in so doing the pressure measurement probe communicates with the internal cavity.

With this preferred embodiment, the teat rubber behavior can, for example, be measured in that the internal cavity is initially filled with cleaning fluid. With a changing pressure difference profile on both sides of the teat rubber, the change in position of the teat rubber to be measured occurs, which can lead for example to the intake or delivery of the cleaning fluid. A flow meter, arranged in the mandrel and assigned to an outlet, can together with the pressure measurement probe pass data to the evaluation device, the said data being processed for determination of the teat rubber behavior.

With regard to the best possible cleaning of the internal cavity it is also preferable with the mandrel connected to the internal cavity to arrange the pressure measurement probe in a non-contacting manner to the teat rubber. The pressure measurement probe can, for example, be fitted to the surface of a measurement mandrel communicating with the internal cavity, but not completely pushed into the internal cavity.

In an alternative arrangement the mandrel is formed as a pressure measurement probe, replicating the teat rubber geometry at least circumferentially and acquiring a contact pressure which acts on the outer circumferential surface of the pressure measurement probe and is applied by the teat rubber. With this type of measurement probe those absolute relationships, and in particular pressures, which actually act on a teat of representative dimensions accommodated in the internal cavity, are determined with high accuracy. Preferably in this respect, the pressure measurement probe can be arranged as a tactile sensor on the outer circumferential surface of the pressure measurement probe. Alternatively, with another preferred embodiment of the milking device according to the invention a membrane is arranged on the outer circumferential surface of the pressure measurement probe, the said membrane covering a pressure measurement chamber filled with a fluid, the said chamber communicating with a pressure sensor. This preferred development has the advantage that the pressure applied by the teat rubber is determined circumferentially as a hydrostatic pressure. Any deviations in the position of the pressure measurement probe therefore lead to hardly any errors in the measurement results. This preferred development is also suitable for the accurate measurement of pressures which act on the teat of the animal to be milked during the suction phase due to an outward radial movement of the teat rubber.

In a preferred development the mandrel comprises at least one temperature measurement probe. This provides the possibility of masking out changes in the teat rubber behavior which are caused by temperature, either through standard temperature conditions for all measurements or determining temperature differences and taking them into account during the assessment of the teat rubber behavior in the evaluation device. Furthermore, with the temperature probe the temperature of the fluid introduced into the internal cavity can be monitored and controlled. It has been found that the temperature dependent influences on the teat rubber behavior cannot be compensated with sufficient accuracy through calculations of the temperature correction, but rather a procedure must be adopted in which the teat rubber is brought to a standard, specified and accurately set temperature during the check. The temperature measurement probe enables a check of the actual temperature of the fluid in the internal cavity.

With regard to the method this invention suggests that the behavior of the teat rubber is determined with a pressure difference profile acting between the pulse cavity and the internal cavity during a cleaning and/or disinfecting phase. With the method according to the invention, determining the teat rubber behavior is included as an integral constituent part of a cleaning or disinfecting phase. In other words the implementation of a separate checking stage for ensuring uniform quality during milking is not required.

Preferably the movement of the teat rubber is determined under practical conditions, i.e. the absolute pressure in the internal cavity is measured under the retention of an internal cavity pressure acting in the internal cavity during the milking stage. The pressure difference acting through the teat rubber in this method corresponds precisely to the temporal course of the pressure difference which is also established initially in the suction phase and finally in the relief phase during milking.

In a further preferred embodiment of this invention the pressure difference profile is set to correspond to the pressure difference profile acting during milking. With this preferred development the checking of the teat rubber behavior then occurs under precisely those pressure conditions which also prevail during milking. For the setting of the pressure difference profile the pressure profile already set up for milking can in a simple manner be applied in the pulse cavity and then also in the internal cavity. Consequently, with the method according to the invention not only can the movement of the teat rubber be found under test conditions, but rather exactly those radial pressures can be found which are applied in practice by the milking device on the teat.

In another preferred embodiment of this invention the absolute pressure acting in the internal cavity is measured. With this preferred method those irregularities in the movement of the teat rubber can be detected, which result from the superimposition of the pressure in the pulse cavity with a pressure in the internal cavity which has not been accurately determined.

Preferably the teat rubbers of a number of teat cups are checked at the same time, whereby faulty behavior from many of the teat rubbers to be checked produces a signal indicating a milking system fault. With this type of measurement result it must in fact be assumed that the simultaneously checked teat rubbers on the teat cups are not indicating faulty behavior. Rather this type of measurement result indicates that a fault in the milking system itself exists, for example a fault in the pressure source and/or associated valves in the pulsator for the pressure in the internal cavity and/or for the pressure in the pulse cavity. With an increasing number of simultaneously checked teat cups the reliability of the indication about a milking system fault increases.

The signal is preferably indicated as a visual and/or acoustic signal directly at the milking station, i.e. the point in the milking system where the corresponding milking device is used. The visual and/or acoustic signal leads immediately to the recognition of the malfunction by the user of the milking system.

In a preferred development of the method according to the invention all the data representing the behavior of the teat rubber is passed to an evaluation device. This data includes not just the data which represents the movement or the reaction behavior of the teat rubber to a pressure difference profile. Rather, data is also passed to the evaluation device which in particular represents the pressure difference profile on both sides of the teat rubber. This data is compared with reference data in the evaluation device.

Discovered malfunctions, which are indicated when the evaluated behavior of the teat rubber lies outside of a specified tolerance range, are, in a preferred development of the method according to the invention, displayed at the milking station terminal. The milking station terminal is regularly used for setting the milking conditions at the milking station and has a display device on which also the malfunction can displayed and further analyzed. This means that the signal indicating the malfunction of a single teat cup within a milking device can be differentiated from the corresponding signals of the other teat cups of the milking device so that a defective part can the found as quickly as possible and replaced.

In a particularly preferred embodiment according to claim 18 a predetermined temperature is set in the internal cavity. Temperature differences, which regularly occur in the operation of the milking system due to seasonal changes and which affect the behavior of the teat rubber, can therefore be eliminated when checking the teat rubber. A fluid introduced into the internal cavity is particularly preferred for moderating the temperature of the teat rubber. Due to this measure, a predetermined temperature can be produced uniformly in the whole teat rubber with high reliability. With this method a body enclosing the pressure measurement probe is, for example, fitted in the internal cavity which also contains the outlets for the cleaning and/or disinfecting fluid. The fluid is preferably tempered to eliminate temperature dependent effects on the teat rubber behavior. During the checking of the teat rubber, the flow of the fluid is preferably interrupted and a hydrostatic pressure is established in the internal cavity. The measurement accuracy is in this way increased.

In a particularly preferred development it is suggested that a number of pulse cycles are run over a predetermined time, then tempered fluid is introduced into the internal cavity and finally the behavior of the teat rubber is checked. It has been found that with conformance to the first two steps, the boundary conditions for each check of the teat rubber behavior can be kept constant. Consequently, the teat rubber is first cooled by convection through the internal cavity by running a number of pulse cycles, for example over a period of thirty seconds. Also, the running of a few pulse cycles causes flexing of the teat rubber material. In this way the teat rubber obtains the elastic properties which it actually assumes during milking. After this first step, tempered fluid, e.g. a cleaning and/or disinfecting solution is introduced into the internal cavity. The previously cooled teat rubber is normally heated by the fluid. The checking of the behavior then occurs after an adequate time span for the teat rubber to warm through.

According to a further preferred embodiment of this method long-term faulty behavior of the teat rubber is eliminated in that in the case of automatic milking, in which the milking device is automatically applied to the udder of the animal to be milked, the teat rubber behavior is automatically checked. This preferred development is particularly important for unattended milking.

The method according to the invention offers the possibility of finding malfunctions on the pulsator and also fatigue phenomena and wear on the teat rubber during cleaning or disinfecting the teat cup before each application of the teat cup to an animal to be milked and of detecting when set limits are exceeded. The measurement values found are preferably processed electronically and evaluated at a central station. A comparison of older measurements to a teat cup with more recent measurements enables early detection of arising malfunctions.

BRIEF DESCRIPTION OF THE DRAWINGS

Further details, advantages and features of this invention can be taken from the following description of embodiments in conjunction with the drawing. The drawing shows.

DETAILED DESCRIPTION OF THE INVENTION

Figure 1:
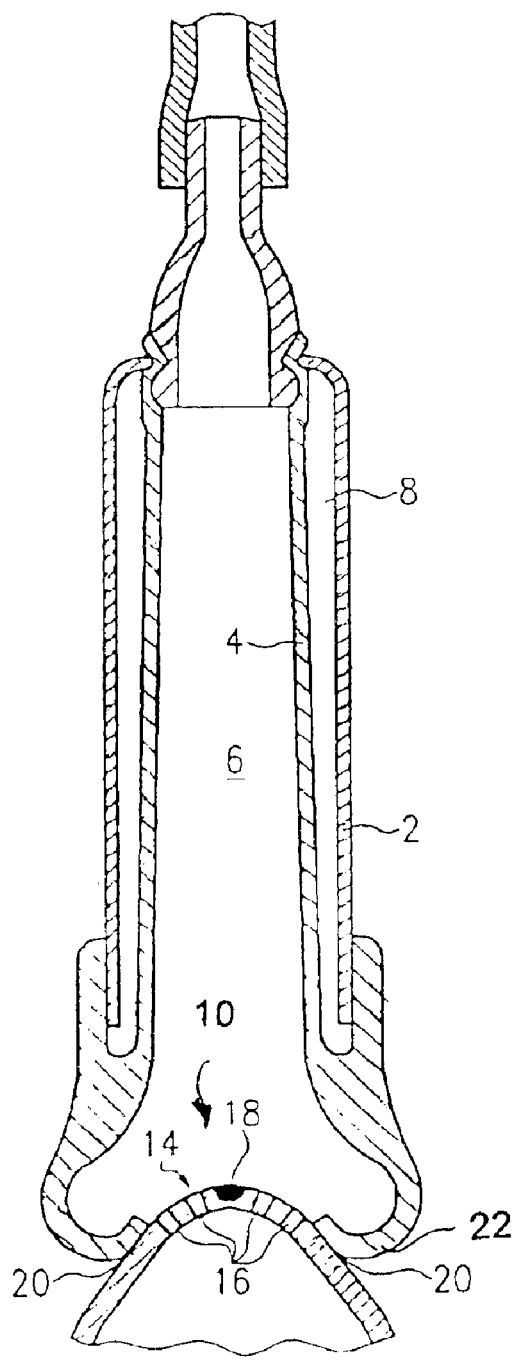
FIG. 1 A teat cup with a first embodiment of a device for checking the teat rubber movement.
Figure 2:
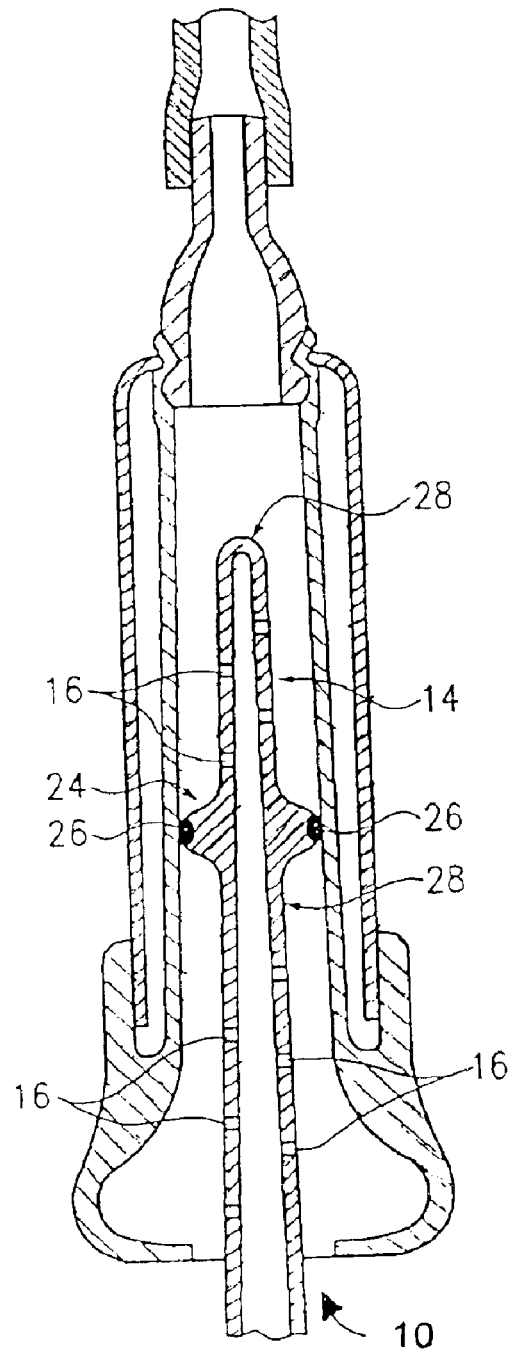
FIG. 2 A teat cup with a second embodiment of a device for checking the teat rubber movement.
Figure 3:
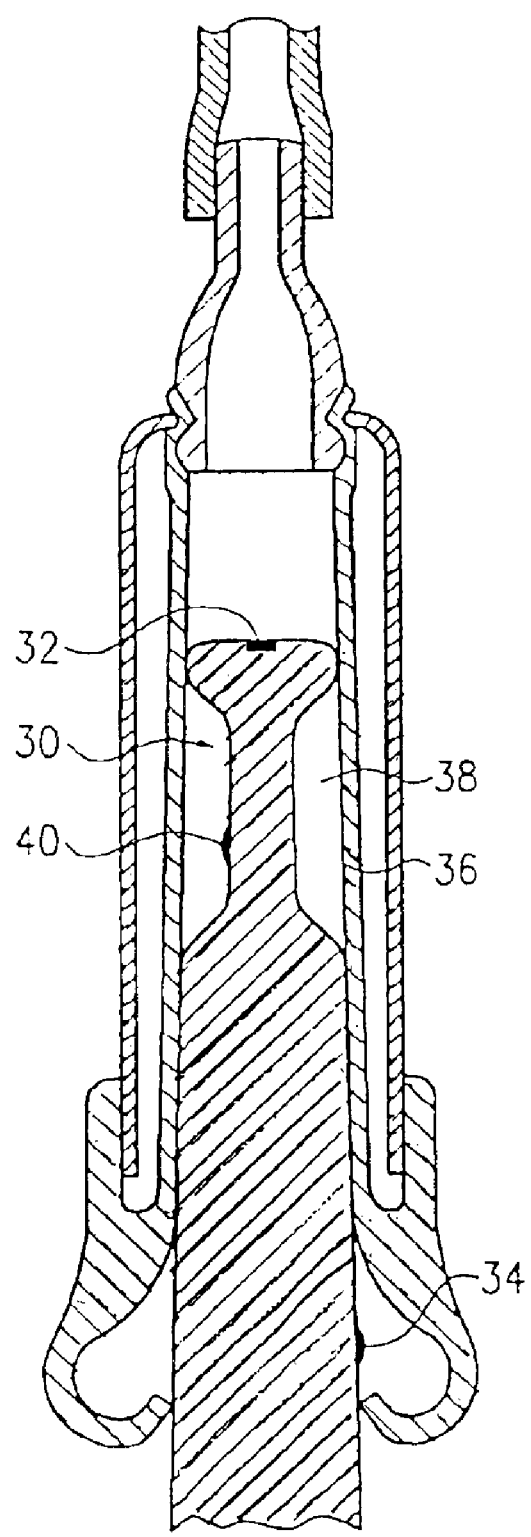
FIG. 3 A teat cup with a device formed as a probe for the direct checking of the teat rubber movement.

In FIGS. 1–3 a longitudinal cross-sectional view through a teat cup is shown with different embodiments of devices for the direct checking of the teat rubber movement. The illustrated teat cups are in each case formed identically and comprise an outer housing 2 and a teat rubber 4. The teat rubber 4 surrounds an internal cavity 6 and forms an opening 10, into which a teat of an animal to be milked, which is not shown here, can be introduced. Between the outer housing 2 and the teat rubber 4 there is a pulse cavity 8, which is connected to a source for negative pressure. For this purpose, lines are always provided, which connect the pulse cavity 8 to the source of negative pressure via intermediate control valves.

The teat rubber 4 is formed from an elastic material and smoothes out changes in the pressure difference between the pulse cavity 8 and the internal cavity 6 due to movement. In FIG. 1 the teat rubber 4 is illustrated in a position which the teat rubber 4 assumes approximately in the suction phase. In the relief phase the walls of the teat rubber come closer together.

With the embodiment shown in FIG. 1 the device comprises a mandrel 14 for the direct checking of the teat rubber movement, the said mandrel having a number of openings 16 for rinsing fluid for applying and removing cleaning and/or disinfecting fluid. A pressure measurement probe 18 is provided at the tip of the mandrel 14. The mandrel also comprises sealing surfaces 20, against which an upper sealing edge 22 of the teat rubber 4 contacts for sealing.

With the embodiment shown in FIG. 1 the movement of the teat rubber is checked directly as follows: First, the internal cavity 6 is flooded with rinsing fluid through the rinsing fluid openings 16. This enables both the teat rubber to be checked with regard to its function and the internal cavity and the milk lines connected to it to be cleaned. The column of fluid brought into the internal cavity through the openings 16 produces a pressure signal on the sensor 18. If the pressure difference between the pulse cavity 8 and the internal cavity 6 is now changed in the suction and/or relief phase, a change of the pressure signal acquired by the sensor 18 results. Based on the height and course of the pressure signal, conclusions can be drawn about the teat rubber behavior. With this method the change of volume in the internal cavity due to the movement of the cleaning fluid upwards into the milk line can be compensated. Also, a defined pressure in the internal cavity can be produced via the milk line.

FIG. 2 illustrates a further embodiment of a device for the direct checking of the teat rubber properties, which is formed by a mandrel 14 with a number of cleaning outlets 16. The mandrel comprises an enlargement 24, which in the plan view is preferably formed star-shaped with rounded corners. Between adjacent webs of the enlargement 24 openings are therefore provided, distributed in the circumferential direction, so that the part of the internal cavity 6 located above the enlargement can communicate with the part located beneath. On the outer circumferential surface of the enlargement preferably a number of contact sensors 26 are provided, which contact the teat rubber at least in the relief phase. Above and/or beneath the enlargement 24 the mandrel 14 can comprise further sensors 28 for acquiring the internal pressure in the internal cavity 6.

The mandrel shown in FIG. 2 is preferably introduced when cleaning fluid is already being delivered through the outlets 16. Consequently, cleaning and, where applicable, disinfection of the internal wall of the teat rubber 4 occurs already with the introduction of the mandrel 14 into the internal cavity 6. With the mandrel 14 inserted into the internal cavity 6 the pressure difference between the internal cavity 6 and the pulse cavity 8 then changes. In turn, the pressure also changes with which the teat rubber 4 contacts the sensors 26. Accordingly, the measurement signal from the pressure sensors 26 changes which represents a measure of the movement of the teat rubber 4. Also, during the checking of the teat rubber movement, rinsing and/or disinfecting fluid can be introduced through the openings 16 in the internal cavity. During the measurement this fluid flows out of the internal cavity 6 which is open at the bottom.

In FIG. 3 a probe 30 is shown as a further embodiment of a device for the direct checking of the teat rubber movement. This probe 30 has a geometry which replicates the size and shape of the normal teat. A pressure measurement probe 32 is provided on the front face of the probe 30. A further pressure measurement probe 34 is located at that point situated shortly behind the inlet in the internal cavity 6. The major part of the surrounding surface of the mandrel 30 contacting the teat rubber 4 is formed by a membrane 36, which covers a measurement chamber 38 formed in the probe 30. The measurement chamber 38 contains a fluid. The measurement chamber also exhibits a measurement chamber sensor 40.

With a change in the pressure difference between the internal cavity 6 and the pulse cavity 8, a change in the pressure is also produced directly in the measurement chamber 38. The membrane does not just follow the movement of the teat rubber 4 when it collapses, but also when it expands, i.e. the movement in the suction phase. The movement of the membrane 36 is restricted by the compressibility of the fluid contained in the measurement chamber 38. The fluid can be a gas. Alternatively, the measurement chamber 38 can also communicate with a rising tube, which is open at the top and arranged outside the probe 30. The level of this rising tube reproduces the movement of the teat rubber 4.

Alternatively, a flow meter can also be provided in a line connecting the pressure measurement chamber 38 to the rising tube. In this case the signal from the flow meter indicates the direct movement of the teat rubber.

With all the embodiments described above a temperature measurement probe can additionally be provided to acquire the temperature in the internal cavity 6. This enables changes in the behavior of the teat rubber compared to a reference value, which only depend on temperature, to be eliminated by calculation during the determination of the actual state of the teat rubber.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Milking device with at least one teat cup, which comprises an internal cavity (6) for the accommodation of the teat of an animal to be milked through an opening (10) in the teat cup and a pulse cavity (8), which is separated from the internal cavity (6) by a teat rubber (4) and which can be connected to a source of negative pressure, characterized in that a cleaning and/or disinfecting device with at least one mandrel (14), which comprises at least one outlet (16) for fluid which can be connected through the opening (10) to the internal cavity (6) as well as a device (12, 14, 30), assigned to the mandrel (14), for checking the behavior of the teat rubber.

2. Milking device according to claim 1, characterized in that the mandrel (14) comprises a sealing surface (20) which contacts the teat rubber (4) for sealing.

3. Milking device according to claim 1, characterized by at least one pressure measurement probe (28, 32), with which the absolute pressure prevailing in the internal cavity (6) can be measured.

4. Milking device according to claim 1, characterized in that a pressure measurement probe is formed such that the pressure change of a fluid contained in the internal cavity can be acquired.

5. Milking device according to claim 1, characterized in that a pressure measurement probe (18) is arranged on the mandrel (14) connected to the internal cavity (6) without mechanical contact with the teat rubber (4).

6. Milking device according to claim 1, characterized by a pressure measurement probe (30) which replicates the teat geometry and which acquires a contact pressure acting on the outer circumferential surface of the pressure measurement probe (30) and applied by the teat rubber (4).

7. Milking device according to claim 1, characterized in that a pressure measurement probe (26) is arranged as a tactile sensor on an outer circumferential surface of the device, subject to the action by the wall of the teat rubber (4), for the direct checking of the teat rubber movement.

8. Milking device according to claim 1, characterized in that a membrane is arranged on a circumferential surface of the device for the direct checking of the teat rubber behavior, the said surface being subject to the action of the teat rubber (4), the said membrane covering a pressure measurement chamber (38) filled with a fluid and that the pressure sensor (40) communicates with the pressure measurement chamber (38).

9. Milking device according to claim 1, characterized in that the device for the direct checking of the teat rubber behavior includes at least one temperature measurement probe.

10. Method for milking a dairy animal with a device according to one of the previous claims, characterized in that the behavior of the teat rubber is acquired with a pressure difference profile acting between the pulse cavity and the internal cavity during a cleaning and/or disinfecting phase.

11. Method according to claim 10, characterized in that the absolute pressure prevailing in the internal cavity is measured.

12. Method according to claim 10, characterized in that the pressure difference profile is set in accordance with the pressure difference profile prevailing during milking.

13. Method according to claim 10, characterized in that the teat rubbers of many teat cups, preferably combined in a milking device, are checked simultaneously and that, with the faulty behavior of several teat rubbers, a signal is produced to indicate a milking system fault.

14. Method according to claim 10, characterized in that a pressure prevailing in the pulse cavity and/or in the internal cavity is measured by pressure sensors arranged on the teat cup.

15. Method according to claim 10, characterized in that the data representing the behavior of the teat rubber is passed to an evaluation device and is compared with reference data which reproduces a set-point state of the teat rubber.

16. Method according to claim 10, characterized in that the data representing the behavior of the teat rubber is displayed at a milking station terminal.

17. Method according to claim 15, characterized in that a signal, triggered by the evaluation device, is output at the milking station terminal when the data representing the behavior of the teat rubber lies outside of a predetermined tolerance interval.

18. Method according to claim 10, characterized in that the teat rubber is tempered.

19. Method according to claim 18, characterized in that a tempered cleaning and/or disinfecting fluid is introduced into the internal cavity.

20. Method according to claim 10, characterized in that first a number of pulse cycles are run over a predetermined time, then the tempered fluid is introduced into the internal cavity and finally the behavior of the teat rubber is checked.

21. Method according to claim 10, in which the milking device is automatically applied to the udder of the animal to be milked, characterized in that the milking device is automatically cleaned after each milking of a single animal and the teat rubber behavior is automatically checked.

* * * * *